(12) United States Patent
Chang et al.

(10) Patent No.: US 7,444,522 B1
(45) Date of Patent: Oct. 28, 2008

(54) DYNAMIC NEGOTIATION OF SECURITY ARRANGEMENTS BETWEEN WEB SERVICES

(75) Inventors: Symon Szu-Yuan Chang, Fremont, CA (US); Joseph S. Sanfilippo, San Jose, CA (US); Jayaram Rajan Kasi, San Jose, CA (US); Christopher Crall, Seattle, WA (US)

(73) Assignee: Open Invention Network, LLC, Pound Ridge, NY (US)

( * ) Notice: Subject to any disclaimer, the term of this patent is extended or adjusted under 35 U.S.C. 154(b) by 295 days.

(21) Appl. No.: 10/246,276

(22) Filed: Sep. 18, 2002

(51) Int. Cl.
*H04L 9/00* (2006.01)
*H04K 1/00* (2006.01)

(52) U.S. Cl. .................. 713/189; 713/150; 726/1; 380/255

(58) Field of Classification Search .............. 713/189, 713/154, 201, 156, 176, 175, 200; 726/1
See application file for complete search history.

(56) References Cited

U.S. PATENT DOCUMENTS

| | | | |
|---|---|---|---|
| 5,005,200 A | | 4/1991 | Fischer |
| 5,157,726 A | * | 10/1992 | Merkle et al. ............... 713/176 |
| 5,159,630 A | * | 10/1992 | Tseng et al. .................. 380/18 |
| 5,224,166 A | | 6/1993 | Hartman, Jr. |
| 5,311,438 A | | 5/1994 | Sellers et al. |
| 5,557,798 A | | 9/1996 | Skeen et al. |
| 5,784,566 A | * | 7/1998 | Viavant et al. ............. 709/229 |
| 5,790,677 A | | 8/1998 | Fox et al. |
| 5,812,669 A | | 9/1998 | Jenkins et al. |
| 5,935,248 A | * | 8/1999 | Kuroda ......................... 726/14 |
| 5,941,945 A | | 8/1999 | Aditham et al. |
| 6,049,785 A | | 4/2000 | Gifford |
| 6,072,942 A | | 6/2000 | Stockwell et al. |
| 6,115,744 A | | 9/2000 | Robins et al. |
| 6,125,391 A | | 9/2000 | Meltzer et al. |
| 6,148,290 A | | 11/2000 | Dan et al. |
| 6,226,746 B1 | * | 5/2001 | Scheifler ........................ 726/1 |
| 6,269,380 B1 | | 7/2001 | Terry et al. |
| 6,389,533 B1 | * | 5/2002 | Davis et al. ................. 713/162 |
| 6,393,442 B1 | | 5/2002 | Cromarty et al. |

(Continued)

FOREIGN PATENT DOCUMENTS

WO   WO 01/33369 A1   5/2001

OTHER PUBLICATIONS

Open Applications Group White Paper Document No. 20010301, Best Practices and XML Content for eBusiness and Application Integration, OAGIS Extensions Release 1.1, 2001, pp. 1-34.

(Continued)

*Primary Examiner*—Kimyen Vu
*Assistant Examiner*—Ponnoreay Pich
(74) *Attorney, Agent, or Firm*—Ernest J. Beffel, Jr.; Haynes Beffel & Wolfeld, LLP (57) ABSTRACT

The present invention relates to computer-based devices and methods negotiate and implement security arrangements between two or more web services. More particularly, it relates to devices and methods that specify input and output interfaces, computation and generation of a security contract consistent with inputs, and implementation of security in accordance with negotiated security arrangements. Particular aspects of the present invention are described in the claims, specification and drawings.

18 Claims, 4 Drawing Sheets

U.S. PATENT DOCUMENTS

| | | | |
|---|---|---|---|
| 6,425,119 | B1 | 7/2002 | Jones et al. |
| 6,434,628 | B1 | 8/2002 | Bowman-Amuah |
| 6,463,460 | B1 | 10/2002 | Simonoff |
| 6,538,673 | B1 | 3/2003 | Maslov |
| 6,636,889 | B1 | 10/2003 | Estrada et al. |
| 6,671,695 | B2 * | 12/2003 | McFadden .................. 707/102 |
| 6,732,101 | B1 * | 5/2004 | Cook ........................... 707/10 |
| 7,219,223 | B1 * | 5/2007 | Bacchus et al. ............. 713/150 |
| 2003/0046583 | A1 | 3/2003 | Goldman et al. |
| 2003/0074579 | A1 * | 4/2003 | Della-Libera et al. ....... 713/200 |
| 2003/0208505 | A1 | 11/2003 | Mullins et al. |

OTHER PUBLICATIONS

VORDEL Web Services Security: Knowledgebase, http://www.vordel.com/knowledgebase/vordel_view1.html, printed Sep. 11, 2002, 2 pages.

Jones, Information Security article, Jan. 2002, Authorization / EAM Ain't Easy, http://www.infosecuritymag.com/2002/jan/features_earn.shtml, 12 pages.

WebServices Framework & Assertion Exchange Using SAML, 5 pages, http://www.w3org/2001/03/WSWS-popa/paper23/, printed Sep. 11, 2002.

Glushko article: Advanced Technology Program Close Out Performance Report: Project Title: Component-Based Commerce: The Interoperable Future, Apr. 14, 2000, 8 pages.

Glushko article: ATP Close Out Performance Report: Component-Based Commerce: The Interoperable Future, 9th revision, last modified Jan. 31, 2000, 57 pages.

White Paper, "Plug and Play Business Software Integration The Compelling Value of the Open Applications Group" Open Applications Group, Copyright 2000, pp. 1-15.

Editors: Dan Brickley and R.V. Guha, Resource Description Framework (RDF) Schema Specification, W3C Proposed Recommendation Mar. 3, 1999, W3C XP-002203858, available at http://www.w3.org/TR/1999/PR-rdf-schema-19990303, 1-29.

Editors: David Beech et al., "XML Schema Part 1: Structures", W3C Working Draft May 6, 1999, W3C XP-002203859, available at http://www.w3.org/1999/05/06-xmlschema-1, 1-53.

Editors: Paul V. Biron and Ashok Malhotra, "XML Schema Part 2: Datatypes", World Wide Web Consortium Working Draft May 6, 1999, W3C XP-002203860, available at http://www.w3.org/1999/05/06-xmlschema-2, 1-28.

Kent Brown, "Biztalk: Fluent in E-Business", XP-002203861, Dec. 1-6, 1999.

W. Yeong, T. Howes, S. Kille, "Lightweight Directory Access Protocol", ISODE Consortium, Mar. 1995, pp. 1-19.

R. Moats, "URN Syntax", AT&T, May 1997, pp. 1-7.

Nils Klarlund, Anders Moller, Michael I. Schwartzbach, "Document Sructure Description 1.0", AT&T and BRICS 1999, XP-002203865, pp. 1-34.

K. Narayanaswamy, K.V. Bapa Rao, "An Incremental Mechanism for Schema Evolution in Engineering Domains", IEEE 1988, pp. 294-300.

Editors: Tim Bray, Jean Paoli, C.M. Sperberg-McQueen, "Extensible Markup Language (XML) 1.0", World Wide Web Consortium Dec. 8, 1997, W3C XP-002203864, available at http://www.w3.org/TR/PR-xml-971208, 1-32.

A Davidson, M. Fuchs, M. Hedlin, M. Jain, J. Koistinen, C. Lloyd, M. Maloney, K. Schwarzhof, Schema for Object-Oriented XML 2.0, W3C Note Jul. 30, 1999, W3C XP-002203857, available at http://www.w3/org/1999/07/NOTE-SOX-19990730, 1-22.

Schneier, Bruce, Applied Cryptography 1966, John Wiley and Sons, Inc., pp. 40-41.

Cover Pages: Web Services Description Language (WSDL), Technology Reports, 31 pages, Jul. 9, 2002, located at http://xml.coverpages.org/wsdl.html.

Salz, R., O'Reilly xml.com: Examining WSDL, May 15, 2002, located at http://www.xml.com/pub/a/2002/05/15/ends.html, 5 pgs.

\* cited by examiner

DYNAMIC NEGOTIATION OF SECURITY ARRANGEMENTS BETWEEN WEB SERVICES

RELATED APPLICATIONS

This application is related to the commonly owned U.S. patent application Ser. No. 10/199,967, entitled "Electronic Commerce Community Networks and Intra/Inter Community Secure Routing Implementation", by inventors Raghunath Sapuram, Jayaram Rajan Kasi, Todd Klaus, Christopher Crall, and Joseph Sanfilippo, filed on 19 Jul. 2002 and incorporated herein by reference. This application also is related to the commonly owned U.S. patent application Ser. No. 10/199,963, entitled "Registry Driven Interoperability and Exchange of Documents", by inventors Christopher Todd Ingersoll, Jayaram Rajan Kasi, Alexander Holmes, Michael Clark, Ashok Aletty, Sathish Babu K. Senathi, and Helen S. Yuen, filed on 19 Jul. 2002 and incorporated herein by reference.

This application is related to two commonly owned U.S. patent applications filed the same day as this application, entitled "Exposing Process Flows And Choreography Controllers As Web Services", by inventors Jayaram Rajan Kasi, Vinkesh Omprakash Mehta, Raghunath Sapuram, and Ram Shankar and "Dynamic Interoperability Contract for Web Services", by inventors Jayaram Rajan Kasi, Rashmi Murthy, Symon Szu-yuan Chang, Todd Klaus, and Helen Yuen. The two applications filed the same day are hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

REFERENCE TO COMPUTER PROGRAM LISTING APPENDIX

A computer program listing appendix comprising duplicate copies of a compact disc, named "CM1035," accompanies this application and is incorporated by reference. The computer program listing appendix includes the following files:

| File | Size | Date |
|---|---|---|
| SecuritySenderReceiverInfo.XSD (File containing schema for negotiation inputs.) | 25,351 bytes | created Sep. 17, 2002 |
| SecurityContractKeyInfo.XSD (File containing schema for keys used for security.) | 15,532 bytes | created Sep. 17, 2002 |
| SecurityContract.XSD (File containing schema for security contract output from negotiation.) | 15,298 bytes | created Sep. 17, 2002 |
| CommunitySecurityTemplatesInfo.XML (File containing schema for negotiation inputs.) | 9,065 bytes | created Aug. 29, 2002 |
| SecuritySenderInfo.XML (File containing sender info in example.) | 13,302 bytes | created Sep. 11, 2002 |
| SecurityReceiverInfo.XML (File containing sender info in example.) | 17,221 bytes | created Sep. 12, 2002 |
| ComputeSecurityContract.XML (File containing computed security contract in example.) | 4,689 bytes | created Sep. 12, 2002 |

BACKGROUND OF THE INVENTION

The present invention relates to computer-based devices and methods to negotiate and implement security arrangements between two or more Web Services. More particularly, it relates to devices and methods that specify input and output interfaces, compute and generate a security contract consistent with inputs, and implement security in accordance with negotiated security arrangements. Particular aspects of the present invention are described in the claims, specification and drawings.

Business-to-business (B2B) and application-to-application (A2A) electronic commerce are replacing former protocols for electronic data interchange (EDI). As businesses strive to improve their efficiency with B2B and A2A systems, a number of incompatible platforms and competing standards have emerged. Among compatible standards, gaps remain to be filled. For instance, the industry has defined what a simple web service is. Standards related to simple web service include UDDI, WSDL, XSDL and SOAP. However, these standards do not fully meet the security, reliability, manageability, and choreography requirements for practical B2B and A2A electronic commerce. Security in particular presents numerous options and configuration issues. Collaborative web services and their security needs are expected to evolve as non-web businesses do. There is no any comprehensive or unified device or method that dynamically resolves and updates security options and configurations as web services evolve.

There are a number of industry initiatives to extend standards applicable to B2B and A2A electronic commerce. Choreography efforts include ebXML/BPSS from OASIS, WSFL from IBM, and XLANG from Microsoft. Conversation efforts include ebXML/TRP from OASIS and Microsoft's WS-routing. The dominant security effort is WS-security from IBM and Microsoft, there is also a complementary security effort in OASIS called SAML. For reliability, there are proposals from Microsoft, ebXML/TRP from OASIS, and HTTPR from IBM. W3C is addressing standardization in all of these areas. Key industry players have formed a rival consortium called WSI. However, they have not addressed the dynamic security negotiation issue.

Accordingly, an opportunity arises to develop methods and devices that dynamically resolve security option and configuration issues for trading partners.

SUMMARY OF THE INVENTION

The present invention relates to computer-based devices and methods negotiate and implement security arrangements between two or more web services. More particularly, it relates to devices and methods that specify input and output interfaces, computation and generation of a security contract consistent with inputs, and implementation of security in accordance with negotiated security arrangements. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
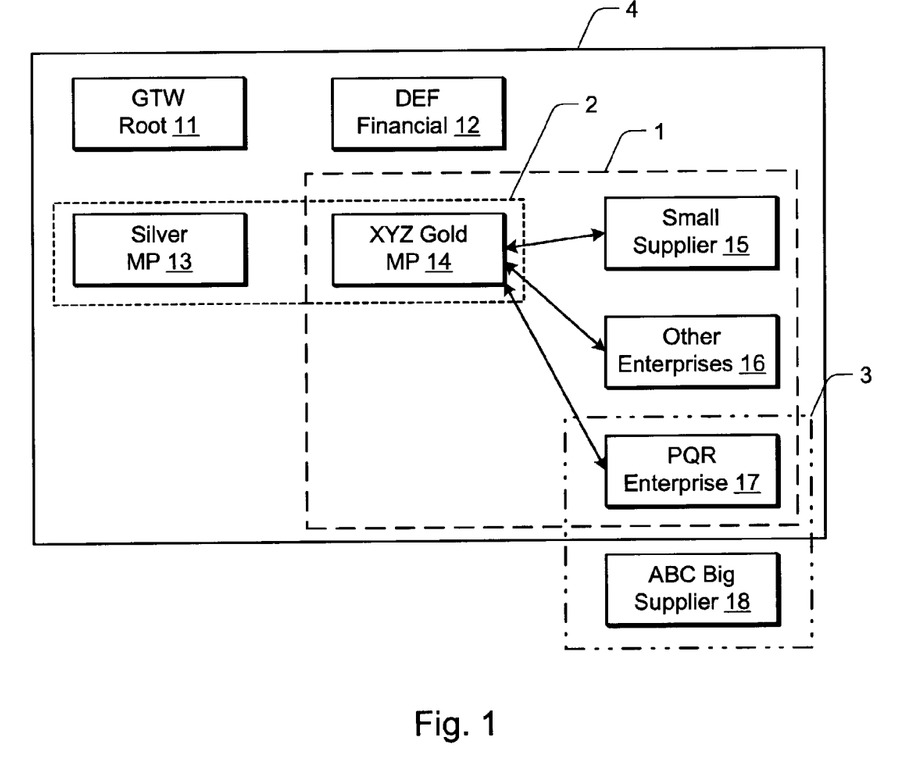
FIG. 1 illustrates communities and networks of communities, which are one environment in which computer-assisted, dynamic negotiation of security arrangements is useful.

FIG. 1 illustrates communities and networks of communities, which are one environment in which computer-assisted, dynamic negotiation of security arrangements is useful. Among these communities, a community maintains a local registry that includes information such as users, companies, services and connectors that are part of the community. The community can be a marketplace, an enterprise or a sub enterprise. Communities can belong to one or more community networks. Typically, communities and networks have some common business interest. Interoperation is between member communities in one or more community networks. The networks include a gold marketplace network 1, a precious metal marketplace network 2, a private network 3 and a global trading web network 4. In this illustration, the gold marketplace network 1 and the precious metal marketplace network 2 are contained within the global trading web network 4. The precious metals marketplace network 2 includes gold and silver marketplaces 14, 13. Gold marketplace customers can trade silver in the silver marketplace 13 and silver marketplace customers can trade in gold 14. One community, PQR Enterprise 17 belongs to the gold marketplace network 1, the private network 3 and the global trading web network 4; another community, ABC Big Supplier 18 belongs to the private network 3. In this illustration, XYZ Gold 14 is a marketplace or community for trading gold. Enterprises belong to this community. Enterprises like PQR Enterprise 17 that have formed a community by themselves belong to the gold marketplace network 1. These communities are part of the gold marketplace network 1, and the global trading web network 4. Small supplier 15 is part of the gold marketplace community. Other enterprises 16 are communities that are part of the gold marketplace community network 1. The connections between XYZ Gold 14 and other gold marketplace entities 15-17 indicate that the gold marketplace requires all traffic between enterprises (communities or otherwise) transacting gold trading to be routed through XYZ Gold 14, for instance, to collect billing and business intelligence information. PQR Enterprise 17 is a community is part of the gold marketplace and also part of local private network with supplier 18. Small supplier 15 may be an individual small supplier that does not want to form a community by itself and instead registers its metadata, such as users, organizations, services and transformations, in the registry of the gold marketplace. On the other hand, ABC Big Supplier 18 has formed a private network of its own, for instance because it wants to keep its metadata, internal back office systems and transformations hidden from general public access because they were developed at considerable cost. Because PRQ 17 is a customer of ABC 18, it participates in the private network 3. Financial service provider DEF Financial 12 wants to provide financial services to anyone in the global trading web network 4, such forms a community of its own and registers with the global trading web root 11. A network of communities makes available a global registry of communities. The global registry permits lookup of the community and determination of one or more routes to that community, or to external connectors through which the electronic commerce documents bound for the community may be routed. Documents routed from one community to another may be routed directly between external connectors for the two communities or indirectly through one or more intermediary communities. Business and security rules for transactions involving the communities also can be defined and maintained in community registries. In general, FIG. 1 illustrates the mixed loyalties of entities and communities that create an impetus for interoperability among electronic commerce platforms.

Connector is a general term for applications that communicate with other applications. Connectors may communicate on a peer-to-peer (P2P) basis or on a directed basis through other connectors that function as hubs, gateways, external ports, central connectors, etc. Connectors that communicate P2P are able to communicate with other connectors that use the same transport/envelope protocols. Connectors that communicate P2P optionally may enlist the assistance of other hub connectors that perform translation services, when trying to communicate with a connector that does not use the same transport/envelope protocol. Connectors that communicate on a directed basis communicate through hub connectors according to routing rules. Routing rules among connectors can be mapped in a directed graph, supporting one or more hub and spoke topologies for one or more transport/envelope protocols. A hub and spoke topology directs communications along spokes to hubs, in one or more tiers. This facilitates centralized services such as billing, business intelligence collection, tracking, auditing, accounting, or others. Multiple hub and spoke organizations may overlay the same connectors to support different transport/envelope protocols and technologies, as suggested by FIG. 2. For instance, a stronger hub and spoke organization may be required to use Sonic as a transport technology than to use HTTP or HTTPS. Optionally, communication routes may depend on whether the source and destination are part of the same community. Within a sub-community (which may include the whole community), centralized functions may be unneeded and P2P communications permitted among connectors that otherwise are directed to communicate with parent connectors when communicating with destinations in other sub-communities.

Connectors may be labeled simple connectors (sometimes simply called connectors), hubs (sometimes called gateways or routers) or central connectors. Alternatively, they may be described functionally. Simple connectors are directed to communicate via hub connectors, except when they are permitted to communicate P2P among connectors in the same sub-community. So-called hubs are used by connectors that are explicitly directed or linked to them. Hubs may serve more than one function and, accordingly, may appear more than once in a route from a source to a destination. Hubs forward electronic commerce documents or messages. Hubs also may translate among transport protocols that support a common envelope protocol. For instance, a hub may translate envelope protocols and also implement a different transport protocol upon transmission than upon receipt. A central connector is a special case of a hub, which can be used by connectors that are not explicitly directed or linked to them. A central connector is useful, for instance, to carry out translation functions when traversing connectors from a source according to routing rules does not lead to any hub that supports the transport/envelope protocol used by the destination.

A schema and a process flow provide an overview of security arrangements according to aspects of the present invention. In this context, negotiation of security arrangements is carried out by a computer-based process that uses security profiles of sending and receiving services to determine a mutually agreeable security arrangement. Preferably, this security arrangement is negotiated or potentially updated regularly, without user intervention. This arrangement may be negotiated, updated or checked for validity at a user request or without user intervention whenever messages are exchanged or on some other periodic or occasional basis, such as monthly, weekly, daily, on occurrence of an event that impacts exchange of messages between a particular sender and receiver (e.g., a software component failure or a change in security preferences), when a previously negotiated arrangement fails, or on some other periodic or occasional basis. The schema SecuritySenderReceiverInfo.XSD, in the source code appendix, describes some inputs to negotiation of security arrangements. The schema SecurityContract.XSD, also in the source code appendix, describes one embodiment of negotiated security arrangements, in a so-called security interoperability contract document ("SCID"). The process flow FIG. 1 can be used to describe negotiation and implementation of security arrangements.

The schema SecuritySenderReceiverInfo.XSD, in the source code appendix, can be used to validate a plurality input files to negotiation of security arrangements. In this embodiment, the machine-readable input files are XML documents. In other embodiments, other data structures may be used to store the same information, for instance a tree structure modeled after the XML code. The schema SecuritySenderReceiverInfo.XSD is best understood by loading the file into an integrated development environment (IDE) such as XML Spy™, which provides several alternative views of the schema, including a documentation generation view. Sender and receiver security interoperability contract document information blocks are defined by this schema. Viewed in Spy's schema design view, SecuritySenderReceiverInfo.XSD includes several components that are used to define sender and receiver security information. The CommunitySecurityPolicyPreference component states the community preferences to sign the header, encrypt the credential, and credential preferences. It can be used to specify a default value for a whole community or it could be adapted to specify a default value for a collaboration partner (CP). The SAMsgSecurityPolicy component allows specification of signature and encryption preferences and authentication options. Message exchanged between services may have multiple parts. Signature and encryption policies can be applied to the whole message or individual parts. This approach can readily be extended to applying signature and encryption policies to elements within the parts. The PublicKeys component identifies key records for this CP. The ConnectorCapability component provides routing information to a resource that implements part of the security arrangement, such as a connector name. It includes connector capability parameters such as encryption capability, signature capability, an encryption public key party, and signing public key party. Public key party can be the sender's CP, the receiver's CP, or the owner of the connector, depending on whether signing or encryption is involved. If the public key party is not defined, the key of the message sender can be used for signing and the key of the message receiver can be used for encryption. The SecurityContainer component can be used to carry additional objects that are useful for security. The SendingCPSecurityPolicyProfile component includes the sending CP's available credentials information. The CPSendServicesSecurityPolicy and CPRecvServicesSecurityPolicy component include sets of security policies for the sending and receiving services, respectively. The services preferences and overrides can be defined here.

The schema SecurityContract.XSD, also in the source code appendix, can be used as a model for preparing a machine-readable security interoperability contract document. In this embodiment, the machine-readable document is an XML document. In other embodiments, other data structures may be used to store the same information, for instance a tree structure modeled after the XML code. This schema defines policies and channels for security policies. A security channel defines resources and routes to resources that carry out security algorithms, such as signature, encryption and authentication algorithms. It also may include non-repudiation and authorization resources.

Figure 2:
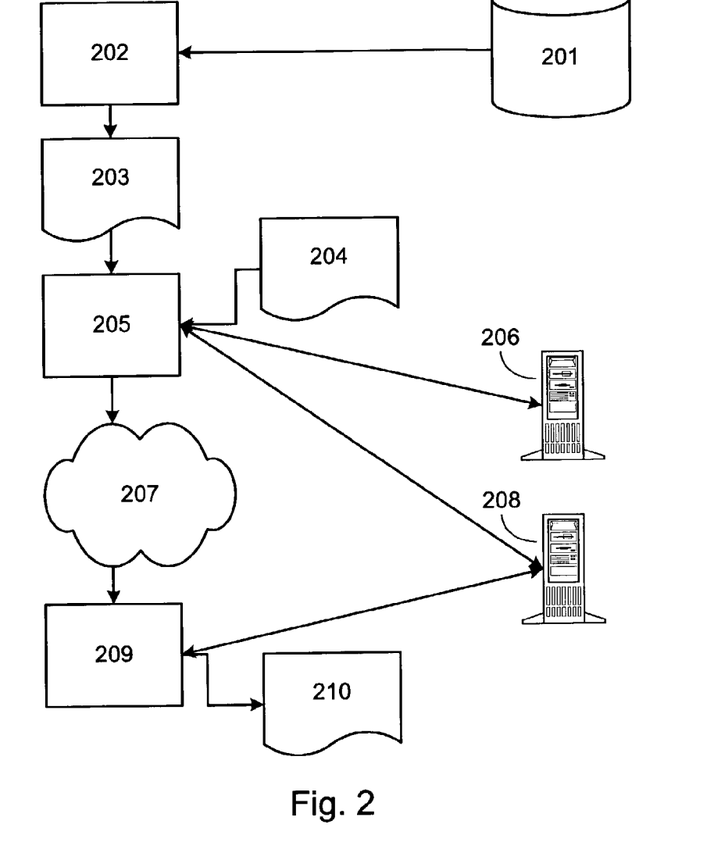
FIG. 2 depicts negotiation and implementation of security arrangements.

The process flow FIG. 2 can be used to describe negotiation and implementation of security arrangements. In one embodiment, the preferences of the sending and receiving services are maintained in a registry 201. This registry may be accessible to the sending and receiving services, so that either service can compute security arrangements, or it may be available to a security arrangement computing service that is accessible to one or both of the sending and receiving services. The sending and receiving services may maintain their own registries. Or, a protocol may be developed for the sending and receiving services to exchange their security preferences as part of the negotiation of security arrangements. A registry 201 further may maintain information regarding default preferences of a collaboration partner that owns a service or a community to which a collaboration partner belongs, or both. Default preferences may be overridden by service-specific preferences, in general, or certain default preferences may be given precedence over service-specific preferences. Default preferences of collaboration partners may be treated differently than default preferences of the community. Input statements of security arrangement preferences are taken from the registry 201 or another source and acted upon by a security arrangements computing service 202. In one embodiment, this computing service is a security contract builder. A set of security arrangements are output 203. These arrangements may be confirmed with the sending and receiving services, may be subject to a veto by the sending or receiving service, or may be trusted by the sending and receiving services. The sending service or another service responsive to the sending service 205 uses the security arrangements 203 to process the document 204 for transmission to the receiving service 209. In some circumstances, the security arrangements will call for obtaining an assertion from a trusted assertion service 206. For instance, the sending and receiving services may agree to use a SAML service to generate authentication assertions. The security arrangement 203 would call for generation of a SAML assertion and the sending service 205 would obtain a SAML assertion from a SAML server 206. In another embodiment, an electronic notarization might be provided by a trusted service 206. Banks or security authorities might be trusted to generate authentication assertions, in a function analogous to notarization. In some circumstances, the security arrangements will call for obtaining public keys used in asymmetrical signing or encryption from a public keys source 208. For instance, the sending and receiving services may agree to use an XKMS service to exchange public keys. The security arrangement 203 would specify the XKMS service address as the source of public keys. The sending service 205 and the receiving service 209 both would access the agreed keys source 208. In accordance with the security arrangements 203 the sending service 205 communicates the document 204 through a network 207 to the receiving party 209. The routing and transport through the network 207 may be part of the security arrangements or, preferably, may be handled by a secure transport infrastructure. The security arrangements 203 may be provided by the computing service 202 to the receiving party 209 or otherwise made accessible to the receiving party, independent of the message carrying the document 204. Alternatively, the security arrangements 203 may be included with the document 204 according to a prearranged protocol. For instance, it may be part of the message header or it may be a separate part of the message. The prearranged protocol may call for the message header or message part to be signed and/or encrypted using the parties' respective keys. With this process flow and schemas above in mind, an example from the source code appendix may be explained.

The files SecuritySenderInfo.XML, SecurityReceiver Info.XML, and ComputeSecurityContract.XML provide an example of sender and receiver preferences and a resulting computed security arrangement. The sender and receiver preferences are stated in XML code conforming to the XML schema explained above. The computed security arrangement is stated in an interoperability security contract document conforming to the SecurityContract.XSD schema in the source code appendix.

In this example, the sender preferences information includes community preferences and service preferences. The community preferences address security algorithms, preferences to sign the header, encrypt the credential and for selection among available credentials. The community preferences also may rank order the security algorithms or otherwise indicate preference among the security algorithms. A similar set of preferences might be provided for a collaboration partner, either instead of more in addition to preferences for a community. In this example, the community has six sets of signature algorithms options in elements named XMLSignatureAlgorithmTemplate and three sets of encryption algorithms options in elements named XMLEncryptionAlgorithmTemplate. These sets of options are templates. More than one template of options can be provided for a particular algorithm. Use of templates simplifies configuration of options and increases the likelihood consistent option sets will be selected by sending and receiving services. The community in this example prefers not to sign headers or encrypt credentials and accepts basic credentials. In general, a community or a collaboration partner may have preferences for any security arrangement options that the service can select, or the community or collaboration partner may have preferences for only some options. Community preferences in a sender's preference file should correspond to community preferences stated elsewhere, such as in a registry entry for community preferences. The file CommunitySecurityTemplatesPreferences.XML is an example of a file used to record some or all of a community's security preferences.

The service (sending service in this example) records in SAMsgSecurityPolicy its preferences for handling message parts, for signature and encryption of the message as a whole, and for authentication. Messages may have several parts. Corresponding to a message part, a service may identify the message part and express a preference for signing or not signing or for encrypting or not encrypting a message part. In this embodiment, a preference for a category of algorithm, such as a general algorithm or in XML-specific algorithm can be selected. In other embodiments, the service might not specify a category of algorithm or it might specify a specific algorithm.

Other arrangements for security are also covered by this example. The receiver's (buyer's) public key, in an X509 format, is use for signature and authentication. Two resources, so-called connectors, are identified for the sending service to use for signing and encryption. The sender's available credentials are identified as basic and X509 credentials. The sending service's security arrangement preferences are rank ordered from one to three under SecurityPolicyTemplatePreference. In this example, the three encryption preferences are all for XML-specific encryption. These and other details of this example are found in the source code appendix file SecuritySenderInfo.XML.

Receiving party preferences are found in the source code appendix file SecurityReceiverInfo.XML. In general, the elements of the receiving party's preference profile are very similar to those of the sending party, even using the same element types from the schema. Significant differences are found in authentication and authorization, since the logic applicable to authentication and authorization depends on whether you are presenting your credentials or determining whether to accept what is presented. For instance, the SendingCPSecurityProfile of the sending party lists available credentials. This element is not part of the receiving party's preferences. This issue is addressed by the receiving party's CPRecvServicesSecurityPolicy, which identifies AcceptedCredentials.

Figure 3:
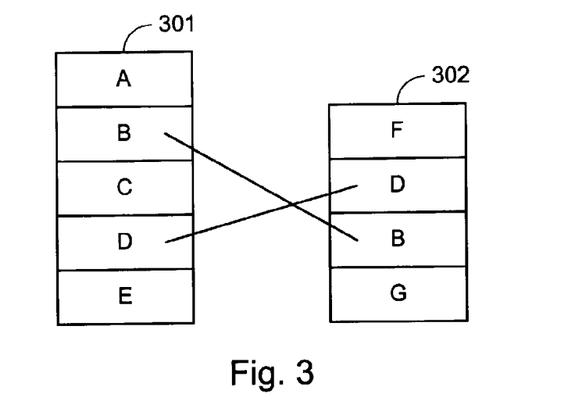
FIG. 3 illustrates reconciling preferences among algorithm types.

In this example, two types of preferences are stated that the security arrangements logic reconciles. One type of preferences is among algorithm templates. The element SecurityPolicyTemplatePreference appears twice in each of the sending and receiving services' preferences, setting forth community and service-specific preferences among algorithms. FIG. 3 illustrates reconciling preferences among algorithm types. Stacks 301 and 302 represent sending and receiving preferences. Suppose A is the most secure and G the least secure. In the two preference stacks 301, 302, preference B and D match. A decision rule for choosing between B or D might take into account one or both stacks of preferences. For instance, the receiving service's preference (D) for signature or the sending service's preference (B) for encryption might be selected from among the matches. Taking both preferences into account, the most secure (B) or the least secure (D) might be selected. In another embodiment, the respective services might weight or score their preferences and a combined weighting or score may be used to take into account both preferences. The second type of preferences is for whether or not to sign or encrypt a part of a message. What to sign or encrypt is addressed by the SAMsgPart elements of SAMsgSecurityPolicy. The message parts in the example are Order and Image. In this example, sender and receiver preferences match, for signing and encrypting the Order and only encrypting the Image. Preferences would not match if the receiver wanted the Image signed, as well as the Order. Then, a decision rule would be needed to resolve the mismatch. The available decision rules could include: receiver wins, sender wins, highest requirement wins or lowest requirement wins. One type of preference reconciliation determines whether to apply a security measure. The other type selects among option templates, when the security measure is applied.

A set of computed security arrangements for this example appear in ComputeSecurityContract.XML, which is partially reproduced below:

<SecurityContractICD . . . >
    <SecurityPolicies>
      <SignaturePolicies>
        <XMLDsigPolicy PolicyId="P-XMLSignatureRSA-
          MD5-C14N">

```xml
<SignaturePolicyAlgorithm> ... </SignaturePolicy-
    Algorithm>
    <SignatureAlg ... >MD5withRSA</Signature
       Alg ... >
    <HashFunction>MD5</HashFunction>
    <Canonical ... > ... 14n-20001026</Canoni-
       cal ... >
    <Transform>...#RoutingSignatureT ... </Trans-
       form>
  </XMLDsigPolicy>
</SignaturePolicies>
<Encryption Policies>
  <XMLEncryptionPolicy PolicyId="P-XMLEncrypt
     3DES-RSA-2048">
  <EncryptionPolicyAlgorithm>http://www.w3.org/
     2001/04/xmlenc#</EncryptionPoli cyAlgorithm>
  <EncryptionMethod>http://www.w3.org/2001/04/
     xmlenc#3des- cbc</EncryptionMethod>
  <KeySize>2048</KeySize>
  <KeyEncryptionMethod>http://www.w3.org/2001/04/
     xmlenc#rsa- 1_5</KeyEncryptionMethod>
  </XMLEncryptionPolicy>
</Encryption Policies>
<EncryptionKeyInfo KeyOwner="x- ccns:commer-
     ceone.com:CollaborationParty::sellParty">
  <PublicKeyID>DefaultTestCert</PublicKeyID>
  <X509Data> <X509Certificate>LS0tLS1 ... ==
     </X509Certificate>
  </X509Data>
</EncryptionKeyinfo>
</SecurityPolicies>.
<SecurityChannel        channelId="CHANNEL1"
  sourceConnector="x-   ccns:cup.commerceone.com:
  connector::centerSell"  targetConnector="x-  ccns:
  cup.commerceone.com:connector::centerSell">
  <Confidential AlgorithmId="P-XMLEncrypt3DES-
     RSA-2048">
     <PublicKeyName KeyOwner="x- ccns:commer-
        ceone.com:CollaborationParty::
        sellParty">DefaultTestCert</PublicKeyN ame>
     <MessagePart   Part   Name="Order"   is
        Optional="false"/>
     <MessagePart   Part   Name="lmage"   is
        Optional="false"/>
  </Confidential>
</SecurityChannel>
<SecurityChannel        channelld="CHANNEL2"
  sourceConnector="x-    ccns:cup.commerceone.com:
  connector::buy" targetConnector="x- ccns:cup.com-
  merceone.com:connector::sell">
  <Integrity AlgorithmId="P-XMLSignatureRSA-MD5-
     C14N">
     <PublicKeyName
        KeyOwner="OwnerA">BuyerPublicKey</Pub-
        licKeyName>
     <MessagePart   Part   Name="Order"   is
        Optional="false"/>
  </Integrity>
</SecurityChannel>
</SecurityContractIlCD>
```

This set of security arrangements has two major sections for security policy and security channels. In this example, there is one security policy applicable to the entire message and multiple security channels to implement parts of the security policy. The security policy section sets out the signature policy, and encryption policy and encryption key information. It also may set out policies regarding authentication, authorization and non-repudiation of origin or receipt. In this embodiment, the same signature and encryption policy is applied to all parts of the document. In other embodiments, multiple algorithms could be applied to different parts. The algorithm selected for signature, encryption and authentication are abstracted through templates containing options sets, simplifying the selection of algorithms. Selected algorithms are associated with logic and resources, so different services or processes can be used for signing/verifying and encrypting/decrypting different parts of a message. A public key or certificate can be transmitted in the encryption key element of the security policy section. The security channel section describes services or connectors involved in applying security policies. For a particular policy, the channel section identifies a source connector that requires assistance in applying a security policy (e.g., the sending service requesting encryption), and a target connector that applies the security policy or acts as an intermediary to logic and resources that apply the security policy. For a particular security policy, such as signing, encryption, authentication, authorization or non-repudiation, specific information required to carry out the security policy is provided in the security channel section.

The data used to determine security arrangements can be categorized as message and activity related data, CP-service related data, security algorithms related data, routing related data, encryption key related data and configuration data. Some additional detail regarding use of these categories of is described below. Message and activity related data relates to digital signatures, encryption, non-repudiation, and authorization. For non-repudiation, a receiver may require non-repudiation measures for a sender, amounting to a trusted party verification of the sender's message to receiver. Similarly, a sender may require non-repudiation measures for a receiver, amounting to a trusted party verification of receipt of sender's message by the receiver. Beyond the description above, it should be mentioned that signatures and encryption can be applied on an element basis, to particular items of data, if fine granularity is desired. In addition, overrides can be specified for pairs of sending and receiving services. For instance, a pre-existing or proven relationship can be treated differently than an entirely new relationship. Overrides to security policies can be implemented to cautiously reduce (or increase, as warranted) security requirements in particular cases.

CP-related data includes authentication and authorization data. Authorization is the process of granting or denying access to a network resource. Authorization to access most computer security systems is a two-step process. The first stage is authentication, which ensures that a principal (user, process, application or service) is who it claims to be. The second stage is authorization, which allows the principal access to various resources based on their identity. Authorization is also called access control. Access control is used to authorize access to website resources. It manages information about users, groups of users, and the roles assigned to users. SAML provides an XML-based means to share information about security events (authentication and authorization) and attributes (e.g. credit rating) in a SOAP message. This SAML data can then be sent to a third-party, and this enables 'distributed trust', whereby the user signs on once, but can re-use their authentication or authorization details. With SAML or a similar trusted party technology, the issuing authority decides whether to grant the request by subject services or sender, for access type to resource web service, given the evidence provided by the requestor. The authorization decision allows or denies a subject access to a specific resource. SAML is useful option for web services security, but it requires an initial degree of trust and technical resources. In instances when SAML is unavailable or not preferred, other approaches such as ID/password and a table of privileges associated with an ID can be used. The present invention is not limited by the authorization technology used, but extends more abstractly to selection among presently available or hereafter invented technologies. With either SAML authorization or ID/password technologies, the authorization data can be encrypted and built into the message.

Security algorithms related data includes algorithms and configuration options for signature, encryption and non-repudiation. As the schema illustrates, signature algorithms options (XML or non-XML) may include use of XMLDsig, choice of a Canonicalization algorithm, a signature method and a digest algorithm. Encryption/decryption options (XML or non-XML) may include key size, key and method. Default may be inherited by a service, either overriding the services preferences or being overridden. In addition, specific overrides can be specified for CP pairs, as described above. Option templates, also described above, simplify negotiation of security arrangements. Different options will apply to XML and non-XML algorithms, signature algorithms for example. XML signature algorithms, e.g., XMLDisg, my offer options for method, Canonicalization, transform and digest, while non-XML algorithms, e.g., PCKS#7, may have options for signature and digest methods, only. Use of community standard security templates are preferred, to ensure that there is at least one match between preference lists of the respective services. A community may require all CP's or all services operating in the community to support a particular community standard security option set, to assure that messages can be exchanged within the community.

Routing related data includes how to access logic and resources that implement authentication/verification, signing/verification, and encryption/decryption. Any type of access information may be used, such as a universal resource name (URN) or universal resource locator (URL). As discussed in one of the prior applications referred to above, a message may take multiple hops through connectors for translation or other value-added services. Accordingly, multiple route steps may be associated with any action. Security typically will need to be reapplied after any translation or other value-added service.

Encryption key related data is generally discussed above.

Configuration key related data includes default (e.g., community or collaboration partner) preferences and credential preferences.

Figure 4:
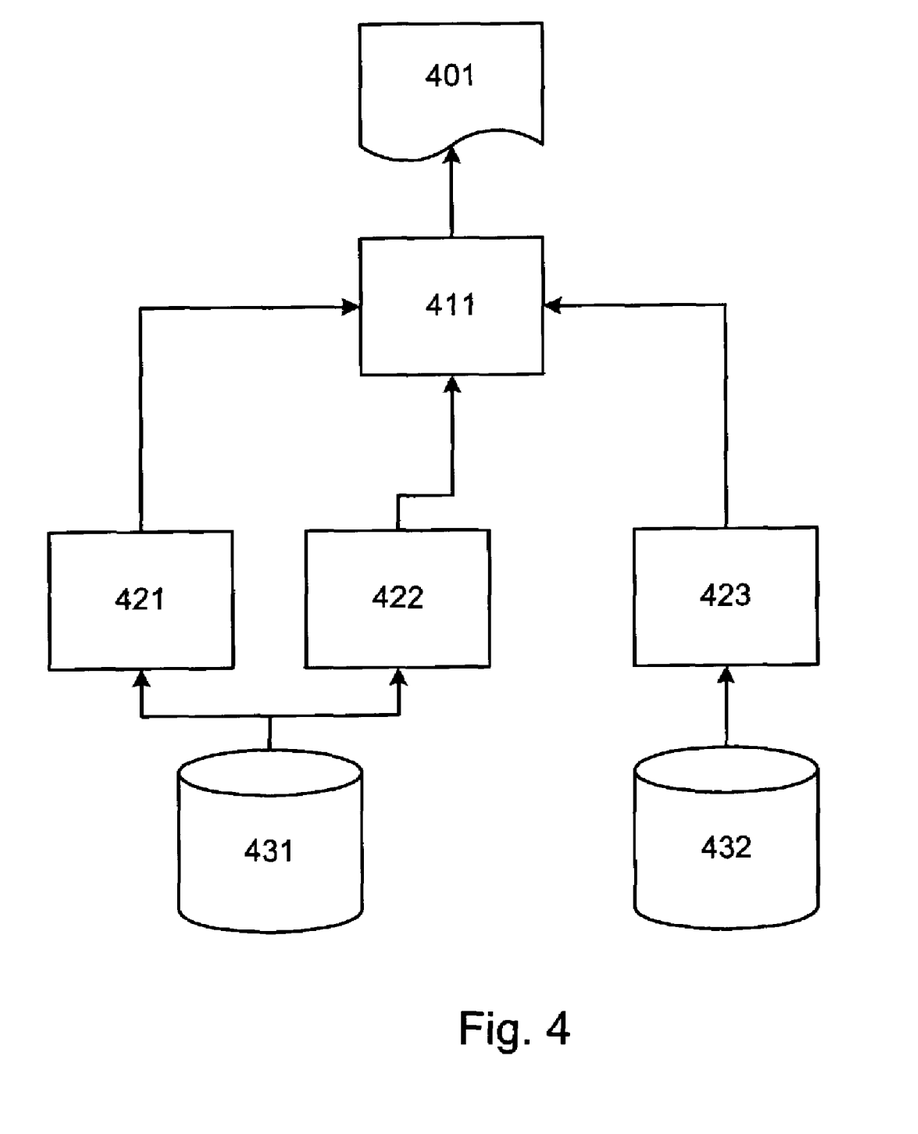
FIG. 4 illustrates alternative embodiments for obtaining receiver's information when the sender is local to calculations of the security arrangements.

FIG. 4 illustrates alternative embodiments for obtaining receiver's information when the sender is local to calculations of the security arrangements. In the figure, local 431 and remote 432 registries are indicated. In this example, the sender is local and the receiver remote. The sender's data is current and complete in the local registry 431. The sender's information is collected 421 and made available to the logic and resources that compute the security arrangements 411. The receiver's data may be current and complete, for instance if the receiver is in the same community as the sender and there is a community-wide registry, or if the receiver's information has been recently obtained and locally cached. Depending on where the receiver's information can be found, 431 or 432, a process 422 or 423 is invoked to collect the receiver information and make it available to the logic that computes security arrangements. A set of security arrangements 401 result.

Figure 5:
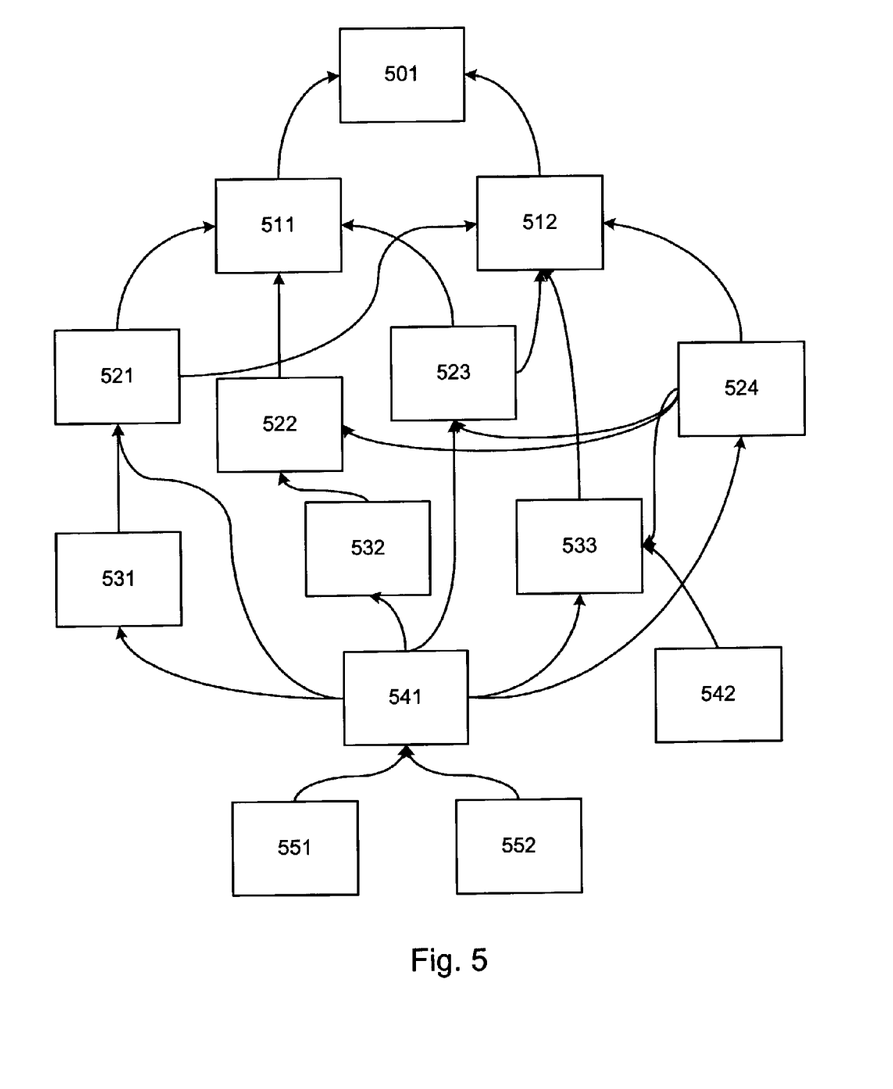
FIG. 5 illustrates one network of program logic and resources that can be used to implement aspects of the present invention.

FIG. 5 illustrates one network of program logic and resources that can be used to implement aspects of the present invention. The logic components of this network include: send side collection 551, receive side collection 552, data object manager 541, routing manager 542, credential negotiator 531, template negotiator 532, connector manager 533, authentication manager 521, policy manager 522, public key manager 523, algorithm manager 524, policy builder 511, channel builder 512 and security arrangements document builder 501.

One embodiment of program logic operative in a community of collaboration partners to generate security arrangements can be described as follows: Collect the receiver security information, including an attribute assertion to authenticate the sender CP. Collect the sender security information. Look into routing block to find all connectors information to implement security measures. Get capability parameters for each connector. Walk through the routing chain to find which connector-pair to use for authentication, signature, and encryption. Get the recever's service-activity-message object. This may include getting a SAMsgSecurityPolicy object from the receiver. This will have multiple parts and it can have signature and encryption policies for the whole message. It also may include getting a SAMsgSecurityPolicy object from the sender, and match the override options the SAMsgSecurityPolicy object accordingly. (Override decision tables are discussed below.) From the SAMsgSecurityPolicy object, find all algorithms required for this message, and build RequiredAlgorithmList. Get community preference objects for both SenderInfo and ReceiverInfo. This may include getting a CommunitySecurityTemplatesPreference object of the sender, which includes security algorithm templates, and community security policy preferences. It also may include getting a CommunitySecurityTemplatesPreference object of the receiver, if not the same community. If they are in the same community, it may be sufficient to set an object pointer. Get CP-Service objects for both sender and receiver services and get CP objects for corresponding communities. This may include building the CPSecurityPolicyPreference of the sender and receiver. Based on the sender and receiver preferences and the decision rules in a RequiredAlgorithmList, select from the preference lists, and build a RequiredTemplateObjectList. If the services' respective preference list do not match on any algorithm, community defaults may generate a match. Get a ServiceAuthentication object for the receiver service. This will have one or more authentication method specified, including accepted credentials and authentication mode. Match the credential from ServiceAuthentication object and available credentials from CPSecurityPolicyPreference of the sender. If there is more than one match, then get the one that matches CredentialPreference from CPSecurityPolicyPreference of the receiver, or from CommunitySecurityTemplatesPreference corresponding to the receiver. Get the value of SignMessageHeader and EncryptCredential from either the CPSecurityPolicyPreference of the receiver or from CommunitySecurityTemplatesPreference object of the receiver. If no value is specified in either place, set it to a default such as false or true. Using the available sender's credential selected by the receiver, the authentication mode specified in the ServiceAuthentication object for the Receiver the SignMessageHeader Boolean attribute, and the EncryptCredential to build the authentication algorithm. Base on the connector's PublicKeyCapability to get the proper key. This may include getting the encryption key of the sender, if an encryption is required, and getting signature key ID of the receiver, if a signature is required. Get the authentication key ID of the receiver, if an X509 authentication is required. Build the policy section of the security arrangements. Find the connector for the channel section and build the channel section of the security arrangements.

Decision tables may be used to implement the type of preference reconciliation related to whether to sign or encrypt part of a message. Again, decisions could be biased to accept preference not to sign or to accept the receiver's preference, or just the opposite. Some decision tables that could be used to implement possible decision rules follow:

|  |  | Sender Preference | | |
|---|---|---|---|---|
|  |  | Signature Required | Signature Optional | No Signature |
| Receiver Preference | Signature Required | Sign | Sign | Error |
|  | Signature Optional | Sign | Don't Sign | Don't Sign |
|  | No Signature | Error | Don't Sign | Don't Sign |

|  |  | Sender | | |
|---|---|---|---|---|
|  |  | Encryption Required | Encryption Optional | No Encryption |
| Receiver | Encryption Required | Encrypt | Encrypt | Error |
|  | Encryption Optional | Encrypt | Don't Encrypt | Don't Encrypt |
|  | No Encryption | Error | Don't Encrypt | Don't Encrypt |

|  |  | Sender | | |
|---|---|---|---|---|
|  |  | Signature Required | Signature Optional | No Signature |
| Receiver | Signature Required | Sign | Sign | Sign |
|  | Signature Optional | Sign | Don't Sign | Don't Sign |
|  | No Signature | Don't Sign | Don't Sign | Don't Sign |

|  |  | Sender | | |
|---|---|---|---|---|
|  |  | Encryption Required | Encryption Optional | No Encryption |
| Receiver | Encryption Required | Encrypt | Encrypt | Encrypt |
|  | Encryption Optional | Encrypt | Don't Encrypt | Don't Encrypt |
|  | No Encryption | Don't Encrypt | Don't Encrypt | Don't Encrypt |

The present invention is readily extended to support signing and encryption at intermediate connectors along a path between a sender and receiver. It is useful to be able to sign and encrypt documents at connectors along a routing path that are not the message originators or final receivers. This may be useful for gateways, routers and central connectors. For gateways, signing and encryption may need to be performed by a gateway if signed/encrypted message data is transformed from one envelope protocol to another. For routers and central connectors, it may be desirable to use a single entry/exit point into the enterprise for external communities. A router or central connector may act as the central security hub and perform or organize security operations on behalf of the entire enterprise. This may simplifies the PKI management and other administrative burdens. This functionality can be configured by setting up the security capabilities of connectors in the enterprise's part of a community. A connector can be configured on an envelope/transport protocol basis to have signing capability or encryption capability and can be linked to signing and encryption capabilities of the collaboration partner at other connectors. In the case of gateways and routers, you could configure the connector to use the key of the CP owner or the gateway/router connector.

From the preceding description, it will be apparent to those of skill in the art that a wide variety of systems and methods can be constructed from aspects and components of the present invention. One embodiment is a method of dynamically determining security options for exchange of one or more messages between sending and receiving services. This method uses sender and receiver security preferences, which may take the form of machine security profiles for first and second services. The security profiles may identify security options/elements and option subsets that are acceptable to the respective services. The options may include requirements to sign or encrypt one or more parts of the message, signing option subsets corresponding to one or more signing algorithms, encryption option subsets corresponding to one or more encryption algorithms, identification of signing and encryption keys and identification of an authentication algorithm. The dynamic method includes accessing the security profiles and selecting a particular option set that is acceptable to the respective services. Optionally, this option set can be used to communicate a message between the respective services. Several options and aspects of the present invention can be added to this embodiment. Security profiles can be maintained in one or more registries that are accessible to security logic of the first and second services. Default option subsets and/or preferences can be specified in community or collaboration partner security profiles and may be copied into service security profiles. Requirements to sign or encrypt can be applied to the parts of the message or to a message as a whole. Signature and encryption algorithms may be applied to a message as a whole, reducing complexity. Signing and encryption keys may be symmetrical or asymmetrical. Authentication may be carried out by a trusted agent, such as a SAML server, before communicating the message between the respective services. Authentication by a trusted agent may be evidenced by authentication assertion. Alternatively, authentication may include submitting credentials for examination by the receiving service. These credentials may be part of the message or may be transmitted in addition to the message. In addition to authentication, authorization may be addressed by security arrangements. The security profiles may include identification of at least one authorization algorithm to establish a sending service's privileges. This authorization may be implemented by a trusted agent before communicating the message or by submitting credentials to the service receiving the message. A further aspect of the present invention is taken into account preferences of the respective services among option subsets for signing and/or encryption. Preferences of one or both of the services may be taken into account. Any of the decision rules discussed above may be applied, including receiver wins, sender wins, most secure wins, least secure wins or a weighted factoring of both services' preferences. Determination of security arrangements may include determining resources to be used by the respective parties to implement any combination of signatures, encryption, authentication, authorization or non-repudiation. Resources, algorithms and option says may be packaged into security channels. A security channel may implement a single aspect of security.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for computer-assisted processing, systems including logic to implement the methods, media impressed with logic to carry out the methods, data streams impressed with logic to carry out the methods, or computer-accessible processing services. It is contemplated that modifications and combinations will readily occur to those skilled in the art, which modifications and combinations will be within the spirit of the invention and the scope of the following claims.

We claim as follows:

1. A method of dynamically determining security options for exchange of at least one message between services, comprising the steps of:
   providing a computer-readable security option profile data structure stored in memory for a first service;
   obtaining a computer-readable security option profile data structure for a second service;
   wherein the security option profile data structures for the first and second services include
      preference sets, divided into community preferences and service preferences, applicable to communities of collaboration partners and individual collaboration partners, respectively, each preference set including
         algorithm preferences for selecting among security arrangement algorithms;
         security arrangement preferences for selecting among security arrangements; and
         rules for categorizing, prioritizing and comparing preference sets;
   receiving a message at the first service from the second service; and
   employing the rules to determine security algorithms and arrangements between the first and second services.

2. The method of claim 1, wherein community preferences override service preferences.

3. The method of claim 1, wherein preferences can apply to one or more portions of a message.

4. The method of claim 1, wherein preferences can be categorical or specific.

5. The method of claim 1, wherein algorithm preferences include signature algorithm preferences.

6. The method of claim 1, wherein algorithm preferences include encryption algorithm preferences.

7. The method of claim 1, wherein algorithm preferences include authentication algorithm preferences.

8. The method of claim 1, wherein security arrangement preferences include signature arrangement preferences.

9. The method of claim 1, wherein security arrangement preferences include encryption arrangement preferences.

10. The method of claim 1, wherein security arrangement preferences include authentication arrangement preferences.

11. The method of claim 1, wherein one or more steps are carried out by a third service provider.

12. The method of claim 1, wherein one or more steps are carried out by a trusted party service provider.

13. The method of claim 1, wherein the rules include an algorithm for determining preferences among competing standards.

14. The method of claim 1, wherein the rules include weighting factors.

15. The method of claim 1, wherein the rules include weighting factors favoring the service receiving the message.

16. The method of claim 1, wherein the rules include weighting factors favoring the service sending the message.

17. The method of claim 1, wherein the rules include weighting factors favoring the community of the service receiving the message.

18. The method of claim 1, wherein the rules include weighting factors favoring the community of the service sending the message.

* * * * *